United States Patent
Kim et al.

(10) Patent No.: US 12,379,887 B2
(45) Date of Patent: Aug. 5, 2025

(54) DISPLAY APPARATUS AND METHOD OF CONTROLLING THE SAME

(71) Applicant: Samsung Electronics Co., Ltd., Suwon-si (KR)

(72) Inventors: Jungdae Kim, Suwon-si (KR); Hoseong Seo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/793,106

(22) Filed: Aug. 2, 2024

(65) Prior Publication Data

US 2024/0394000 A1    Nov. 28, 2024

Related U.S. Application Data

(63) Continuation of application No. PCT/KR2023/001427, filed on Jan. 31, 2023.

(30) Foreign Application Priority Data

Feb. 3, 2022    (KR) .................. 10-2022-0014130

(51) Int. Cl.
G06F 3/14      (2006.01)
G06F 1/26      (2006.01)

(52) U.S. Cl.
CPC ............ G06F 3/1423 (2013.01); G06F 1/263 (2013.01)

(58) Field of Classification Search
CPC .............................. G06F 3/1423; G06F 1/263
See application file for complete search history.

(56) References Cited

U.S. PATENT DOCUMENTS

| | | | |
|---|---|---|---|
| 5,577,205 A | 11/1996 | Hwang et al. | |
| 5,939,997 A | 8/1999 | Sekine et al. | |

(Continued)

FOREIGN PATENT DOCUMENTS

| | | |
|---|---|---|
| CN | 109885270 A | 6/2019 |
| CN | 110879792 A | 3/2020 |

(Continued)

OTHER PUBLICATIONS

International Search Report for PCT/KR2023/001427, mailed May 9, 2023, 5 pages.

(Continued)

*Primary Examiner* — Robert J Michaud

(74) *Attorney, Agent, or Firm* — Nixon & Vanderhye, P.C.

(57) ABSTRACT

The disclosure relates to a display apparatus and a method of controlling the same, the display apparatus including: a display; a first communication interface unit comprising circuitry; a second communication interface unit comprising circuitry; a power supply; and a controller comprising at least one processor, comprising processing circuitry, individually and/or collectively, configured to: control the display to display a first image based on a signal received from a first external apparatus through the first communication interface unit, control a signal received from the first external apparatus to be output to a second external apparatus through the second communication interface unit to display a second image based on the signal, identify third power suppliable to the first external apparatus, based on first power suppliable by the power supply and second power receivable from the second external apparatus through the second communication interface unit, and control the power supply unit to supply the identified third power to the first (Continued)

external apparatus through the first communication interface unit.

18 Claims, 12 Drawing Sheets

(56) References Cited

U.S. PATENT DOCUMENTS

| | | | |
|---|---|---|---|
| 5,995,729 | A | 11/1999 | Hirosawa et al. |
| 2004/0041533 | A1 | 3/2004 | Noda et al. |
| 2012/0062800 | A1 | 3/2012 | Sisto et al. |
| 2012/0062804 | A1 | 3/2012 | Dunn et al. |
| 2013/0061271 | A1 | 3/2013 | Lu |
| 2013/0298173 | A1 | 11/2013 | Couleaud et al. |
| 2015/0186096 | A1 | 7/2015 | Hall |
| 2016/0034239 | A1 | 2/2016 | Choi |
| 2016/0086521 | A1 | 3/2016 | Hall |
| 2017/0017283 | A1 | 1/2017 | Seo |
| 2017/0097666 | A1 | 4/2017 | Shin et al. |
| 2017/0163928 | A1 | 6/2017 | Dunn et al. |
| 2017/0212574 | A1 | 7/2017 | Kang et al. |
| 2018/0027175 | A1 | 1/2018 | Cho |
| 2019/0064900 | A1 | 2/2019 | Lee et al. |
| 2019/0103048 | A1 | 4/2019 | Kwon |
| 2019/0121594 | A1 | 4/2019 | Akiyama |
| 2019/0250692 | A1 | 8/2019 | Kang |
| 2020/0089296 | A1 | 3/2020 | Fossati et al. |
| 2020/0389630 | A1 | 12/2020 | Fujimori et al. |
| 2020/0401547 | A1 | 12/2020 | Kawabe |
| 2020/0412922 | A1* | 12/2020 | Lee ................. H04N 5/953 |
| 2022/0269326 | A1 | 8/2022 | Yang |
| 2022/0317752 | A1* | 10/2022 | Hartwell ............. G06F 11/2015 |

FOREIGN PATENT DOCUMENTS

| | | | |
|---|---|---|---|
| KR | 19980036036 A | | 8/1998 |
| KR | 20040093336 A | | 11/2004 |
| KR | 20170009279 A | | 1/2017 |
| KR | 20170042406 A | | 4/2017 |
| KR | 20180009701 A | | 1/2018 |
| KR | 20190021768 A | | 3/2019 |
| KR | 20190097485 A | | 8/2019 |
| KR | 20200053111 A | | 5/2020 |

OTHER PUBLICATIONS

Written Opinion of the ISA for PCT/KR2023/001427, mailed May 9, 2023, 3 pages.

Extended European Search Report dated Apr. 1, 2025 issued in European Patent Application No. 23749943.9.

* cited by examiner

DISPLAY APPARATUS AND METHOD OF CONTROLLING THE SAME

CROSS-REFERENCE TO RELATED APPLICATIONS

This application is a continuation of International Application No. PCT/KR2023/001427 designating the United States, filed on Jan. 31, 2023, in the Korean Intellectual Property Receiving Office and claiming priority to Korean Patent Application No. 10-2022-0014130, filed on Feb. 3, 2022, in the Korean Intellectual Property Office, the disclosures of each of which are incorporated by reference herein in their entireties.

BACKGROUND

Field

The disclosure relates to a display apparatus and a method of controlling the same, and for example, to a display apparatus, which supplies power to an external apparatus through a communication interface unit, and a method of controlling the same.

Description of Related Art

As the performance and function of a display apparatus has been diversified, one or more display apparatuses are often used as connected to an external apparatus. For example, a plurality of display apparatuses is connected to an external apparatus such as an image providing apparatus (e.g., a laptop computer) in a daisy chain scheme, so that an image provided from the image providing apparatus can be displayed as extended or duplicated through the connected display apparatuses.

The image providing apparatus may receive power for charging, etc. from a subsequently connected display apparatus. However, when the image providing apparatus requires a large charging capabilities, the charging may not be fully done with the power supplied from the display apparatus, it may take a long time to charge due to a slow charging speed, a warning message about low power may be displayed, and so on, thereby causing inconvenience to a user.

To provide sufficient charging power to the image providing apparatus, it is required to increase the power capabilities of the subsequently connected display apparatus, but a design change in this case unavoidably increases the size and cost of components, thereby limiting a slim design of the display apparatus.

SUMMARY

Embodiments of the disclosure provide a display apparatus, which can provide boosted power to an external apparatus in a usage environment where a plurality of display apparatuses are connected in a daisy chain scheme, and a method of controlling the same.

According to an example embodiment of the disclosure, a display a first apparatus includes: a display; communication interface unit comprising circuitry; a second communication interface unit comprising circuitry; a power supply; and a controller comprising circuitry configured to: control the display to display a first image based on a signal received from a first external apparatus through the first communication interface unit, control a signal received from the first external apparatus to be output to a second external apparatus through the second communication interface unit to display a second image based on the signal, identify third power suppliable to the first external apparatus, based on first power suppliable by the power supply and second power receivable from the second external apparatus through the second communication interface unit, and control the power supply to supply the identified third power to the first external apparatus through the first communication interface unit.

The third power may correspond to a sum of the first power and the second power.

The controller may be configured to: identify the third power by performing power negotiation of transmitting information about suppliable power capabilities corresponding to the third power to the first external apparatus, receiving a power request corresponding to the power capabilities from the first external apparatus, and accepting the received power request and informing the first external apparatus that power is ready.

The power negotiation may include first power negotiation, and the controller may be configured to: identify the first power by performing second power negotiation, based on detecting that the first external apparatus is connected through the first communication interface unit before the second external apparatus is connected, and identify the third power by performing the first power negotiation, based on detecting the second external apparatus is connected through the second communication interface unit while the first external apparatus is connected.

The controller may be configured to control the power supply to supply the identified first power to the first external apparatus through the first communication interface unit, based on the first external apparatus being connected through the first communication interface unit before the second external apparatus is connected.

The display apparatus may further include a third communication interface unit comprising circuitry that does not support power delivery, and a second controller comprising circuitry configured to control the display to display a user interface (UI) configured to inform that additional power is suppliable corresponding to the third power through the second communication interface unit, based on detecting that the second external apparatus is connected through the third communication interface unit.

The controller may include a first controller, and the display apparatus may further include a second controller configured to: control the display to display a UI for interface settings for the second communication interface unit, and control the signal to be output to the second external apparatus through the second communication interface unit based on interface settings for the displayed UI.

The power supply may include a power generator configured to generate the first power, and a power regulator configured to adjust power so that the third power can be supplied to the first external apparatus based on the first power and the second power.

The power supply may further include a switch configured to selectively cut off the second power received through the second communication interface unit.

The power regulator may include a protection unit comprising protection circuitry configured to protect against overcurrent or overvoltage.

The power regulator may include a reverse current protection unit comprising circuitry configured to suppress a reverse current flowing therein through the second communication interface unit.

According to an example embodiment of the disclosure, a method of controlling a display apparatus includes: controlling a display to display a first image based on a signal received from a first external apparatus through a first communication interface unit, controlling a signal received from the first external apparatus to be output to a second external apparatus through a second communication interface unit to display a second image based on the signal; identifying third power suppliable to the first external apparatus, based on first power suppliable by a power supply of the display apparatus and second power receivable from the second external apparatus through the second communication interface unit; and supplying the identified third power to the first external apparatus through the first communication interface unit.

The third power may correspond to a sum of the first power and the second power.

The identifying the third power may include: performing power negotiation of transmitting information about suppliable power capabilities corresponding to the third power to the first external apparatus, receiving a power request corresponding to the power capabilities from the first external apparatus, and accepting the received power request and informing the first external apparatus that power is ready.

The power negotiation may include first power negotiation, and the method may further include: identifying the first power by performing second power negotiation, based on detecting that the first external apparatus is connected through the first communication interface unit before the second external apparatus is connected, and identifying the third power by performing the first power negotiation, based on detecting that the second external apparatus is connected through the second communication interface unit based on the first external apparatus being connected.

The method may further include supplying the identified first power to the first external apparatus through the first communication interface unit, while the first external apparatus is connected through the first communication interface unit before the second external apparatus is connected.

The method may further include displaying a user interface (UI) configured to inform that additional power is suppliable corresponding to the third power through the second communication interface unit, based on detecting that the second external apparatus is connected through the third communication interface unit that does not support power delivery.

The method may further include displaying a UI for interface settings for the second communication interface unit; and controlling a signal to be output to the second external apparatus through the second communication interface unit based on the interface settings for the displayed UI.

In the foregoing display apparatus according to the disclosure and the method thereof, a subsequently connected display apparatus can stably provide sufficient power to an external apparatus without increasing its own power capabilities in a usage environment where a plurality of display apparatuses are connected in a daisy chain scheme.

BRIEF DESCRIPTION OF THE DRAWINGS

The foregoing and other aspects, features and advantages of certain embodiments of the present disclosure will be more apparent from the following detailed description, taken in conjunction with the accompanying drawings, in which.

DETAILED DESCRIPTION

Figure 1:
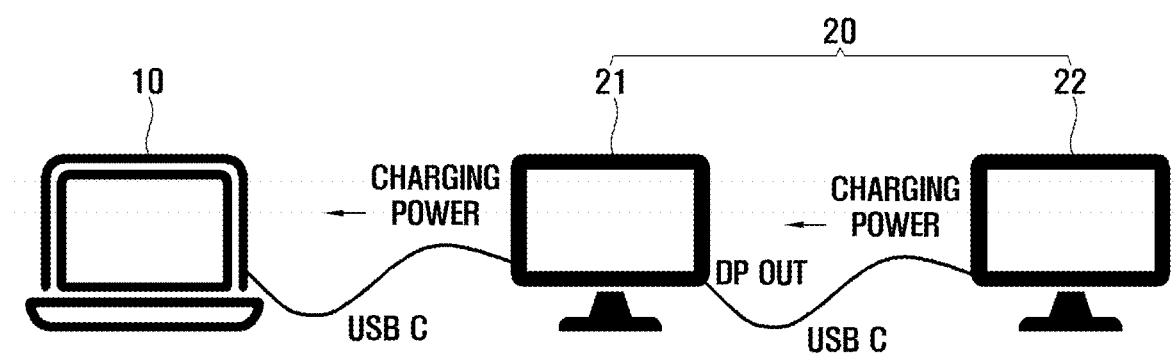
FIG. 1 is a diagram illustrating an example display system according to various embodiments.

Below, various example embodiments will be described in greater detail with reference to accompanying drawings. In the drawings, like numerals or symbols refer to like elements having substantially the same function, and the size of each element may be exaggerated for clarity and convenience of description. However, the configurations and functions illustrated in the following example embodiments are not construed as limiting the present disclosure and the key configurations and functions. In the following descriptions, details about known functions or features may be omitted if it is identified that they cloud the gist of the present disclosure.

In the following example embodiments, terms 'first', 'second', etc. are simply used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not all the plurality of elements but also both each one of the plurality of elements excluding the other elements and a combination thereof.

FIG. 1 is a diagram illustrating an example display system according to various embodiments. An image providing apparatus 10 is an example of an external apparatus according to the disclosure.

Referring to FIG. 1, the display system according to an embodiment of the disclosure includes the image providing apparatus 10 and a plurality of display apparatuses 20.

The image providing apparatus 10 is provided as a signal source that can provide signals corresponding to images to be displayed on the plurality of display apparatuses 20.

According to an embodiment, the image providing apparatus 10 may be implemented as a computer system such as a laptop computer. However, the disclosure is not limited to this embodiment of the image providing apparatus 10. According to an embodiment, the image providing apparatus 10 may be implemented as a set-top box (STB) that can provide content/signals; a player for a Blu-ray disc, a digital versatile disc (DVD), or the like optical disc; a desktop computer or a server. According to an embodiment, the display apparatus 20 may be implemented as a portable terminal, e.g., a mobile device such as a smart phone, a tablet computer, a smart pad, a smart note, a personal digital assistant (PDA), a portable multimedia player (PMP), a navigation device, and an MP3 player.

According to an embodiment, the image providing apparatus 10 may be connected to any one of the plurality of display apparatuses 20 and output a signal to the connected display apparatus 20.

Referring to FIG. 1, the plurality of display apparatuses 20 may be provided to display an image based on a signal received from the image providing apparatus 10.

According to an embodiment, the display apparatuses 20 may include a first display apparatus 21 connected in series to the image providing apparatus 10, and a second display apparatus 22 connected in series to the first display apparatus 21.

According to the disclosure, there are no limits to the number of display apparatuses 20. The plurality of display apparatuses 20 may include three or more display apparatuses 20. For example, when there are three display apparatuses 20, a third display apparatus may be connected in series to the second display apparatus 22. In other words, the display system according to the disclosure may have a daisy chain or cascade structure where the plurality of display apparatuses 20 are connected in sequence.

According to an embodiment, each of the plurality of display apparatuses 20 may receive a signal from the front end to output the signal to the rear end. For example, the first display apparatus 21 in the initial stage receives a signal from the image providing apparatus 10, and outputs the signal to the second display apparatus 22. The first display apparatus 21 may output the signal received from the image providing apparatus 10 as it is to the second display apparatus 22. In the same manner, the second display apparatus 22 may receive the signal from the first display apparatus 21, and, when there is a display apparatus connected to the rear end, output the received signal to that display apparatus. In this way, the signal may be transmitted to the $n^{th}$ display apparatus in the final stage.

According to an embodiment, each of the image providing apparatus 10 and the plurality of display apparatuses 20 is provided with a communication interface unit including various circuitry, including a connector for connection therebetween, and transmits and/or receives a signal to and/or from the apparatus connected to the front or rear end through a cable connected to that connector. According to an embodiment, the connector may, for example, be provided as a universal serial bus (USB) type C (hereinafter also referred to as a USB C) connector. The communication interface unit including the USB type C connector may implement an alternate mode to transmit or receive a signal based on, for example, a DisplayPort (DP) protocol.

Referring to FIG. 1, according to an embodiment, the first display apparatus 21 may receive a signal based on the DP protocol, e.g., data (video/image) from the image providing apparatus 10 of the front end through the USB type C interface in the DP alternate mode, and display an image based on the received signal. The first display apparatus 21 may output the received signal to the second display apparatus 22 of the rear end through the USB type C interface (DP OUT) in the DP alternate mode.

According to an embodiment, the first display apparatus 21 may deliver charging power to the image providing apparatus 10 of the front end through the USB type C interface in the DP alternate mode. The first display apparatus 21 and the image providing apparatus 10 may play the roles of a power source and a power sink, respectively, based on a USB-C power delivery (PD) protocol, thereby delivering the charging power. In other words, the direction of delivering the charging power between the connected apparatuses is opposite to the direction of transmitting the image/video.

According to an embodiment, the first display apparatus 21 may receive the charging power from the second display apparatus 22 of the rear end through the USB type C interface in the DP alternate mode, and provide the charging power boosted based on the received power to the image providing apparatus 10 of the front end.

According to the disclosure, the communication interfaces through which the image providing apparatus 10, the first display apparatus 21, and the second display apparatus 22 are connected in sequence are not limited to the foregoing description, and may be implemented in the form of including other interfaces capable of supporting the signal (video/data) transceiving and power charging, for example, a ThunderBolt connector.

According to an embodiment, the plurality of display apparatuses 20 may display images based on signals received from the front ends thereof, respectively. For example, the first display apparatus 21 may display an image based on a signal received from the image providing apparatus 10, and the second display apparatus 22 may display an image based on a signal received from the image providing apparatus 10 through the first display apparatus 21. The plurality of display apparatuses 20 may be configured to extend or duplicate the image to be displayed thereon, and thus the first display apparatus 21 and the second display apparatus 22 may display different images or the same image.

Referring to FIG. 1, the display apparatus 20 may be implemented as a monitor that can display an image based on a signal received from the signal source such as the image providing apparatus 10. However, the disclosure is not limited to the foregoing example of the display apparatus 20. The display apparatus 20 may be implemented as a television (TV) that can display an image based on a broadcasting signal, and the display apparatus 20 in this case includes a tuner to be tuned to a channel corresponding to the broadcast signal.

Below, the configuration and operations of the display apparatus according to various embodiments will be described in greater detail with reference to the accompanying drawings.

Figure 2:
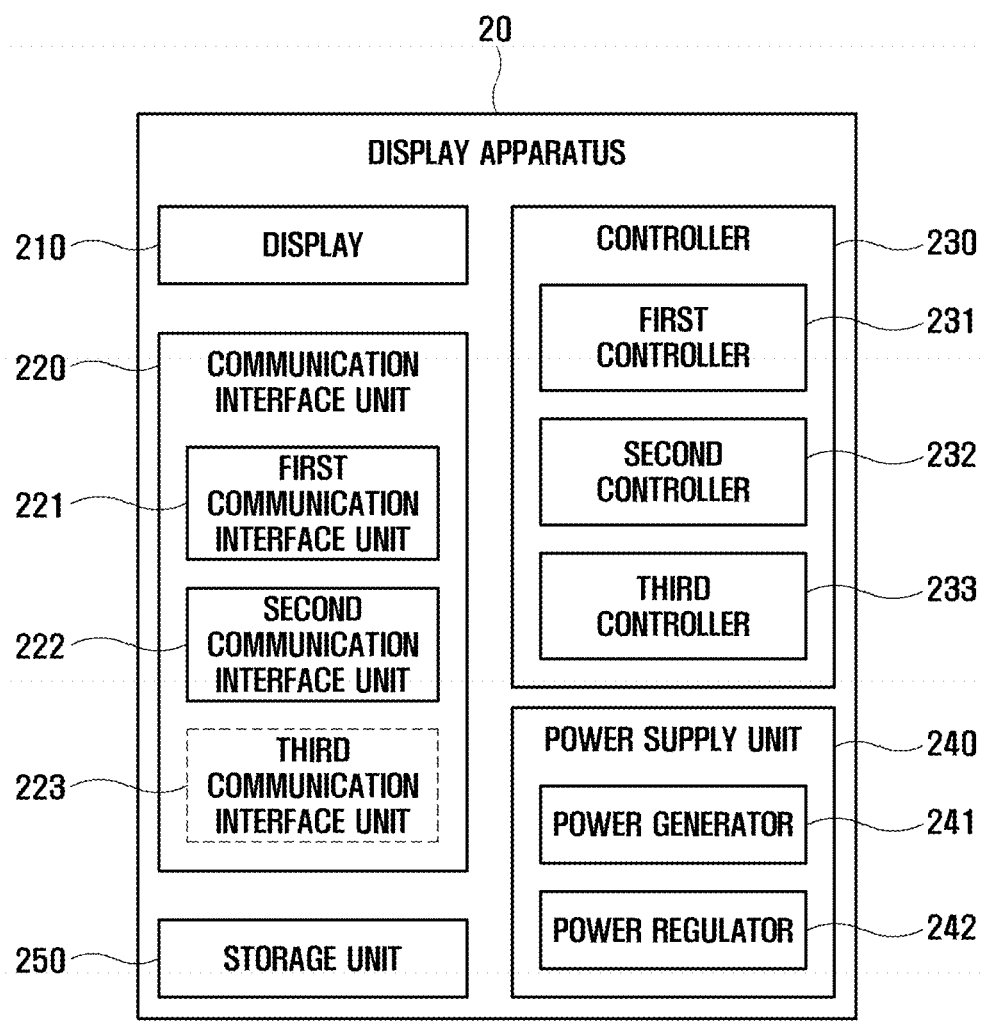
FIG. 2 is a block diagram illustrating an example configuration of a display apparatus according to various embodiments.

FIG. 2 is a block diagram illustrating an example configuration of a display apparatus according to various embodiments.

The display apparatus 20 includes various hardware elements for operations. However, the configuration of the display apparatus 20 according to an embodiment of the disclosure shown in FIG. 2 is merely an example, and the display apparatus according to various embodiments may be implemented by a configuration other than the configuration shown in FIG. 2. In other words, the display apparatus 20 of the disclosure may additionally include elements other than the elements shown in FIG. 2, or may exclude at least one element from the elements shown in FIG. 2. Further, the display apparatus 20 of the disclosure may be implemented by changing some of the elements shown in FIG. 2.

Below, it will be described by way of example that the elements of the display apparatus 20 shown in FIG. 2 are provided in the first display apparatus 21. However, those elements are also commonly included even in the second display apparatus 22, and the descriptions thereof may also be applied even to the second display apparatus 22.

The display apparatus 20 according to an embodiment of the disclosure may, as shown in FIG. 2, include a display 210.

The display 210 may display an image.

The display 210 may be, but not limited to, for example implemented by various display types such as liquid crystal, plasma, light-emitting diode, organic light-emitting diode, surface-conduction electron-emitter, carbon nano-tube, nano-crystal, etc.

According to an embodiment, the display 210 may include a display panel for displaying an image, and may further include an additional element, for example, a driver, according to its implementation types.

The display apparatus 20 may include a communication interface unit (e.g., including various circuitry) 220.

The communication interface unit 220 allows the display apparatus 20 to communicate with the external apparatus connected to the front or rear end thereof. According to an embodiment, for example, the first display apparatus 21 may communicate with the image providing apparatus 10 or the second display apparatus 22 through the communication interface unit 220.

The communication interface unit 220 may include a first communication interface unit 221 and a second communication interface unit 222, each of which include various circuitry.

According to an embodiment, the first communication interface unit 221 and the second communication interface unit 222 may be implemented as wired communication interfaces. The first communication interface unit 221 and the second communication interface unit 222 may for example be the USB type C interfaces in the DP alternate mode, which may include a USB type C connector (terminal or port) 310 (see FIG. 3) to which a USB cable is connected for the connection with the external apparatus.

The first communication interface unit 221 and the second communication interface unit 222, which are implemented as the USB type C interfaces in the DP alternate mode, may transmit and/or receive a signal/data based on the DP protocol, and may transmit and/or receive power based on the USB protocol.

According to an embodiment, the first communication interface unit 221 may be configured to input/receive a signal (image/video) from the image providing apparatus (image source) 10 of the front end based on the DP protocol, and the second communication interface unit 222 may be configured to output/transmit the signal (image/video) to the second display apparatus 22 of the rear end based on the DP protocol.

According to an embodiment, at least one of the first communication interface unit 221 or the second communication interface unit 222 may be provided to transmit and receive a signal bidirectionally, and set to correspond to any one of the input or the output.

According to an embodiment, the first communication interface unit 221 may be configured to supply/transmit the power to the image providing apparatus 10 of the front end based on the USB protocol, and the second communication interface unit 222 may be configured to receive power from the second display apparatus 22 of the rear end based on the USB protocol.

According to an embodiment, the first communication interface unit 221 may be configured to transmit and receive a signal (data) to and from the image providing apparatus 10 of the front end based on the USB protocol, and the second communication interface unit 222 may be configured to transmit and receive a signal (data) to and from the second display apparatus 22 of the rear end based on the USB protocol. The first communication interface unit 221 and the second communication interface unit 222 are capable of transmitting and receiving USB signal/data bidirectionally, but may configured to operate based on any one of up-streaming or down-streaming as necessary.

Figure 3:
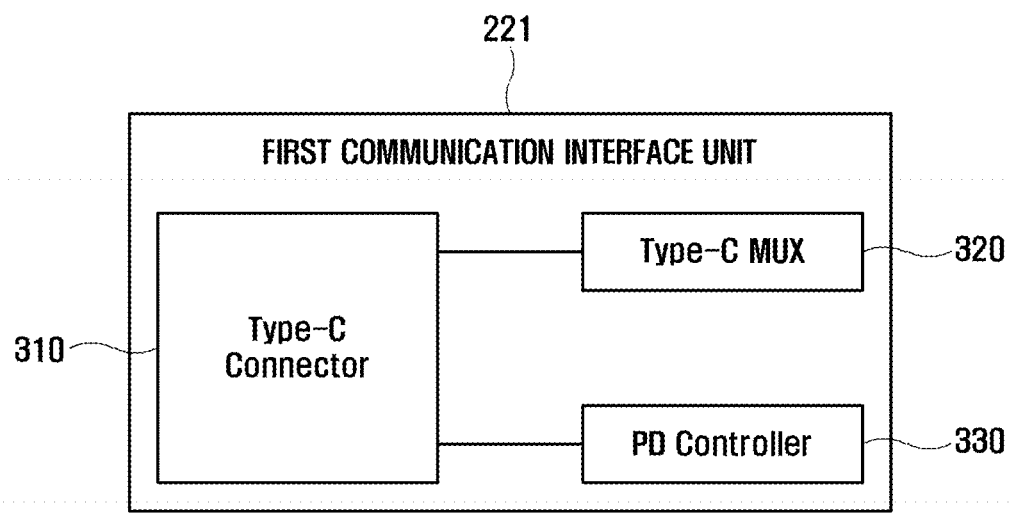
FIG. 3 is a block diagram illustrating an example configuration of a communication interface unit according to various embodiments.

FIG. 3 is a block diagram illustrating an example configuration of a communication interface unit according to various embodiments. FIG. 3 illustrates the configuration of the first communication interface unit 221 by way of example, but the second communication interface unit 222 may also have the same or similar configuration.

Referring to FIG. 3, the first communication interface unit 221 may include a connector (e.g., a type-C connector) 310, a multiplexer (e.g., a type-C MUX) 320, a power delivery (PD) controller (e.g., including circuitry) 330.

The connector 310 of the first communication interface unit 221 may be implemented as a USB C terminal or port shaped corresponding to the USB type C, to which a USB cable for connection with the external apparatus, e.g., the image providing apparatus 10 is connected.

The multiplexer 320 of the first communication interface unit 221 may distribute a signal received from the image providing apparatus 10 through the connector 310. For example, the multiplexer 320 may distribute a signal (video/audio) based on the DP protocol to a first controller (e.g., a scaler) 231 (to be described later), and may distribute a signal (data) based on the USB protocol to a second controller (e.g., a USB hub) 232 (to be described later).

The multiplexer 320 of the second communication interface unit 222 may distribute a signal output to the second display apparatus 22 through the connector 310. For example, the multiplexer 320 may distribute a signal (video/audio) based on the DP protocol output through a DP out block (BLK) of the first controller 231 and a signal (data) based on the USB protocol based on the USB protocol output from the second controller 232 through the connector 310 to the second display apparatus 22.

A power delivery controller (e.g., power delivery integrated chip (IC)) 330 may include various circuitry and controls the first communication interface unit 221 and the second communication interface unit 222 to play the roles of a power source and a power sink, respectively, thereby supplying or receiving the charging power. The first communication interface unit 221 and the second communication interface unit 222 may supply or receive the charging power identified based on power negotiation performed by the first controller 231 (to be described later).

Referring back to FIG. 2, according to an embodiment, the communication interface unit 220 may further include a third communication interface unit (e.g., including circuitry) 223 that transmits/receives a signal/data based on various standards, such as DisplayPort (DP), high-definition multimedia interface (HDMI), HDMI-consumer electronics control (CEC), Component, DVI, Thunderbolt, and RGB cables. Here, the third communication interface unit 223 may include at least one connector (terminal or port) respectively corresponding to these standards.

According to an embodiment, the communication interface unit 220 may further include a connector which connects with an external microphone of an external audio device having a microphone, and inputs or receives an audio signal from that microphone or audio device. The communication interface unit 220 may further include a connector which connects with a headset, an earphone, an external loudspeaker, or the like audio device, and transmits or outputs an audio signal to that audio device. The communication interface unit 220 may further include a connector based on network transmission standards such as Ethernet, a local area network (LAN) card connected to a router or gateway by a wire, etc.

According to an embodiment, the communication interface unit 220 may further include a wireless communication interface unit (e.g., including wireless communication circuitry).

The wireless communication interface unit may be variously implemented corresponding to the types of the display apparatus 20. For example, the wireless communication interface unit may perform wireless communication based on radio frequency (RF), Wi-Fi, Wi-Fi Direct, Bluetooth, Bluetooth low energy, Zigbee, ultra-wideband (UWB), near field communication (NFC) and the like standards.

The wireless communication interface unit may include an IR transmitter and/or IR receiver capable of transmitting and/or receiving an infrared (IR) signal according to infrared communication standards. The wireless communication interface unit may receive or input a signal from a remote controller and the like input device or from other external apparatuses, or transmit or output a signal to other external apparatuses through the IR transmitter and/or IR receiver. As another example, the display apparatus 20 may transmit and receive a signal to and from an input device or other external apparatuses through Wi-Fi, Bluetooth, or other wireless communication interface units.

According to an embodiment, the wireless communication interface unit may transmit predetermined data as information of a user voice received through the microphone or the like voice input unit to a voice recognition server or the like external apparatus. Here, there are no limits to the formats/types of data to be transmitted. For example, the data may include an audio signal corresponding to a voice spoken by a user, or voice features extracted from the audio signal. Further, the wireless communication interface unit may receive data as a result of processing a user's voice from the voice recognition server or the like external apparatus. The display apparatus 20 may output a sound corresponding to the result of processing the voice, based on the received data, to an internal or external loudspeaker.

However, in the foregoing example, the display apparatus 20 may for example process a user's voice by itself without transmitting the voice to the server. In other words, according to an embodiment, the display apparatus 20 may be implemented to serve as a speech to text (STT) server.

When the display apparatus 20 is a TV, the communication interface unit 220 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

In the display apparatus 20 according to an embodiment, a communication module (e.g., including communication circuitry) for communicating with the server or the like external apparatus a communication and module for communicating with the input device such as the remote control may be different from each other. For example, the display apparatus 20 may use an Ethernet modem or a Wi-Fi module to communicate with the external apparatus, and use a Bluetooth module to communicate with the input device.

The display apparatus 20 may include a controller 230. Referring to FIG. 2, the controller (e.g., including various circuitry) 230 may further include the first controller 231, the second controller 232, and a third controller 233. The controller 230 may be implemented by a single processor corresponding to each of the first controller 231, the second controller 232 and the third controller 233, or the whole controller 230 may be implemented by one or at least two processors. The processor(s) of the controller(s) may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The first controller 231 controls the display 210 to display an image (e.g. a first image) based on a signal (image/video) received from the image providing apparatus 10 through the first communication interface unit 221.

According to an embodiment, the first controller 231 may include a scaler that outputs an output signal, which is generated and combined by performing image processing for a signal based on the DP protocol, to the display 210. The first controller 231 may control the output signal to be regulated corresponding to the output standards, e.g., panel specifications of the display 210.

According to an embodiment, the first controller 231 may include a DP out block. A signal (video/audio) based on the DP protocol received from the image providing apparatus 10 through the first communication interface unit 221 may be transmitted to the second communication interface unit 222 through the DP out block, and output to the second display apparatus 22. Here, the first controller 231 may control the DP signal received in the image providing apparatus 10 to be output as it is to the second display apparatus 22.

According to an embodiment, the first controller 231 may perform the power negotiation with the external apparatus, e.g., the image providing apparatus 10, which is connected through the first communication interface unit 221, based on USB-C power delivery (PD) protocol. The first controller 231 may assign the roles of the power source (PWR source) and the power sink (PWR sink) to the two apparatuses, and identify charging specifications (e.g., power amount) based on the power negotiation. For example, the first controller 231 may set the power delivery controller 330 of the first communication interface unit 221 to operate as the power source, and set the power delivery controller 330 of the second communication interface unit 222 to operate as the power sink.

According to an embodiment of the disclosure, the first controller 231 may perform the power negotiation to identify third power to be supplied to the image providing apparatus 10 based on first power to be supplied by the power supply unit 240 (to be described in greater detail below) and second power to be received from the second display apparatus 22 through the second communication interface unit 222, and control the power supply unit 240 to supply the identified third power to be supplied to the image providing apparatus 10. The third power may refer, for example, to power boosted from the first power to be supplied by the power supply unit 240 of the first display apparatus 21, and may for example correspond to the sum of the first power and the second power.

The first controller 231 may be implemented as one or at least two processors that play all or each of the foregoing roles (e.g., the scaler, the power negotiation, etc.). The first controller 231 may be implemented as an individual scaler integrated chip (IC) that performs scaling independently, or as included in a main system-on-chip (SoC) into which various functions are integrated.

The second controller 232 may control a signal (data) to be transmitted and received based on the USB protocol through the first communication interface unit 221 and the second communication interface unit 222.

According to an embodiment, the second controller 232 may control a USB signal/data to be used as connected/extended from the second display apparatus 22. For example, when a peripheral device (e.g., a mouse, a keyboard, etc.) is connected through the USB C communication interface unit of the second display apparatus 22, the second controller 232 may connect with a USB signal (e.g., down-streaming) received from the second display apparatus 22 through the second communication interface unit 222 and output (e.g., up-streaming) the signal to the image providing apparatus 10 through the first communication interface unit 221.

According to an embodiment, the second controller 232 may be implemented as a USB hub IC capable of processing a USB signal, or may be implemented as included in the main SoC in which various functions are integrated.

The third controller 233 performs control for operating general components of the display apparatus 20. According to an embodiment, the third controller 233 may, but not limited thereto, control the display 210 to display various user interfaces (UI) or on-screen displays (OSD). For example, the third controller 233 may control the display 210 to inform the operating states of the display apparatus 20 or display various UIs or OSDs such as user guide messages, and menu items selectable by a user. The third controller 233 may be implemented as a control program (or an instruction) to perform such a control operation, a nonvolatile memory in which the control program is installed, a volatile memory to which at least a part of the installed control program is loaded, and at least one of general-purpose processors such as a microprocessor, an application processor or a central processing unit (CPU) that executes the loaded control program.

According to an embodiment, the third controller 233 may be implemented as included in the main SoC mounted to a printed circuit board (PCB) internally provided in the display apparatus 20.

The control program may include a program(s) achieved by at least one of a BIOS, a device driver, an OS, a firmware, a platform, or an application. According to an example embodiment, the application program may be previously installed or stored in the electronic apparatus 10 when the display apparatus 20 is manufactured, or may be installed in the display apparatus 20 on the basis of application data received from the outside when it is required in the future. The application data may for example be downloaded from an external server such as an application market to the display apparatus 20. Such an external server is merely an example of the computer program product according to the disclosure, but not limited thereto.

The control program may be recorded in a storage medium readable by a machine such as a computer. The machine-readable storage medium may be provided in the form of a non-transitory storage medium or a non-volatile storage medium. The 'non-transitory storage medium' is a tangible device and may not include a signal (e.g., an electromagnetic wave), and this term does not distinguish between a case where data is semi-permanently stored in the storage medium and a case where data is temporarily stored. For example, the 'non-transitory storage medium' may include a buffer in which data is temporarily stored.

The display apparatus 20 may include the power supply unit (e.g., including a power supply) 240.

The power supply unit 240 may supply operation power to the components (e.g., the display 210, etc.) of the display apparatus 20.

Referring to FIG. 2, the power supply unit 240 may include a power generator 241, and a power regulator 242. According to an embodiment, the power supply unit 240 may receive second power (e.g., 50 W (2.5 A/20V)) from the second display apparatus 22 through the second communication interface unit 222.

The power generator 241 may be implemented as a power supply capable of supplying the operation power, for example, a switched mode power supply (SMPS) or a power adaptor. The power generator 241 may for example be configured to supply first power of 50 W (2.5 A/20V). The first power and the second power may be equal to or different from each other.

The power regulator 242 may regulate the power supplied to the image providing apparatus 10 through the first communication interface unit 221. The power regulated in the power regulator 242 corresponds to third power identified by performing the power negotiation in the first controller 231.

In other words, the power regulator 242 may regulate power so that the third power boosted higher than the first power can be supplied to the image providing apparatus 10. According to an embodiment, the third power may correspond to the sum of the first power and the second power, but may be regulated from the sum power as necessary and then supplied to the image providing apparatus 10.

According to an embodiment, the power regulator 242 may include a power summing circuit. In other words, the power regulator 242 may sum the first power supplied from the power generator 241 and the second power delivered from the second display apparatus 22 so that the third power can be output through the first communication interface unit 221.

According to an embodiment, the power regulator 242 may further include a regulator circuit so that the third power regulated from the sum power of the first power and the second power can be output through the first communication interface unit 221.

According to an embodiment, the power supply unit 240 may further include a switch (e.g., a power switch 243 in FIG. 11) that can selectively cut off the second power delivered from the second communication interface unit 222. When the external apparatus targeted for charging, e.g., the image providing apparatus 10 connected through the first communication interface unit 221 needs low power, e.g., is identified as being fully charged, the first controller 231 may control (turn off) the switch to cut off the second power delivered from the second display apparatus 22. Therefore, the first power may be supplied to the image providing apparatus 10. Then, when the charge percentage of the image providing apparatus 10 is lower than or equal to a predetermined reference value (e.g., a charge percentage of 80%), the first controller 231 may turn on the switch to supply the third power to the image providing apparatus 10.

According to an embodiment, the power supply unit 240 may further include a protector, e.g., an overcurrent protection circuit or an overvoltage protection circuit, including various circuitry, to prevent and/or reduce overcurrent or overvoltage.

According to an embodiment, the power supply unit 240 further include a reverse current protection unit including various circuitry to suppress a reverse current flowing therein through the second communication interface unit 222.

The display apparatus 20 may include a storage unit (e.g., including a memory) 250.

The storage unit 250 is configured to store various pieces of data of the display apparatus 20.

The storage unit 250 may be provided as a writable nonvolatile memory (e.g., a writable read only memory (ROM)) which can retain data even though power supplied to the display apparatus 20 is cut off, and reflect changes. In other words, the storage unit 250 may be provided as any one of a hard disk drive (HDD), a flash memory, erasable and programmable read only memory (EPROM), or electrically erasable and programmable read only memory (EEPROM). The storage unit 250 may further include a volatile memory such as a dynamic random access memory (DRAM) or a static random access memory (SRAM), which enables the display apparatus 20 to have reading or writing speed faster than those of the nonvolatile memory.

Data stored in the storage unit 250 may for example include an operating system for driving the display apparatus 20, and various programs, applications, image data, additional data, and the like that can be executed on the operating system.

For example, the storage unit 250 may store a signal or data input/output corresponding to the operations of the elements under control of the third controller 233. The storage unit 250 may store control programs for controlling the display apparatus 20, applications provided by the manufacturer or downloaded from the outside, a UI related to the applications, graphics or images for providing the UI, user information, documents, databases, or related data.

According to an embodiment, an image displayed on the display apparatus 20 may be based on data stored in the storage unit 250. The storage unit 250 may be provided inside or outside the display apparatus 20. When the storage unit 250 is provided outside, the storage unit 250 may be connected to the display apparatus 20 through a wired interface (e.g., the third communication interface unit 223).

According to an embodiment, when the display apparatus 20 is a monitor, the storage unit 250 may include an extended display identification data (EDID) area in which the EDID is stored. The EDID area may be implemented as an independent memory. The EDID may be written in the storage unit 250 in a manufacturing process.

According to an embodiment, when the display apparatus 20 is a TV, the storage unit 250 may store a TV application, a video-on-demand (VOD) application for reproducing content received from an over-the-top (OTT) server or the like, a service application for performing service operations based on image/content information, etc.

Figure 4:
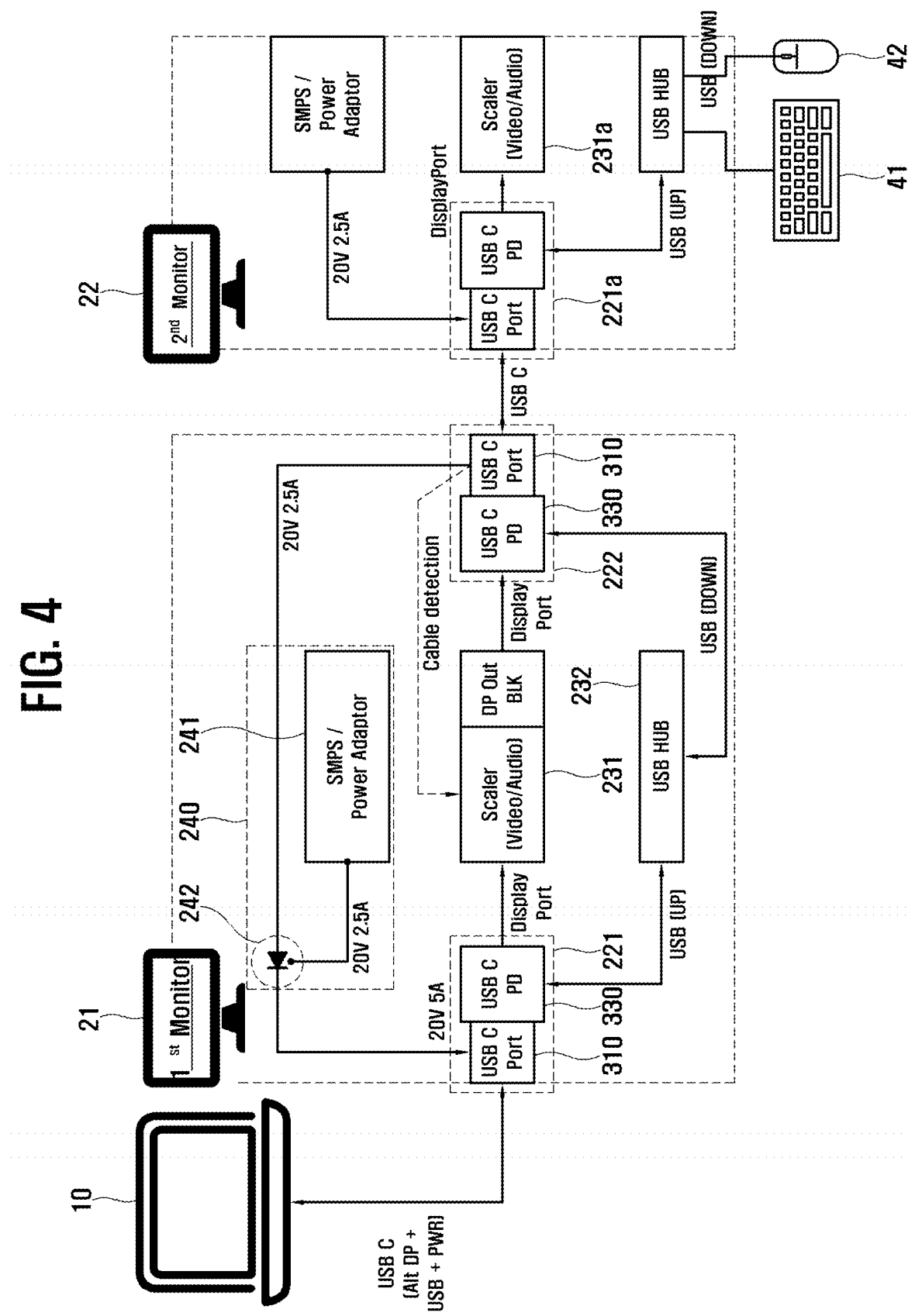
FIG. 4 is a diagram illustrating an example display system that provides boosted power according to various embodiments.

FIG. 4 is a diagram illustrating an example display system that provides boosted power according to various embodiments.

Referring to FIG. 4, the first display apparatus 21 (e.g., a first monitor) is connected to the first external apparatus, e.g., the image providing apparatus 10 (e.g., a laptop computer) through the first communication interface unit 221, and connected to the second external apparatus, e.g., the second display apparatus 22 (e.g., a second monitor) through the second communication interface unit 222.

Figure 5:
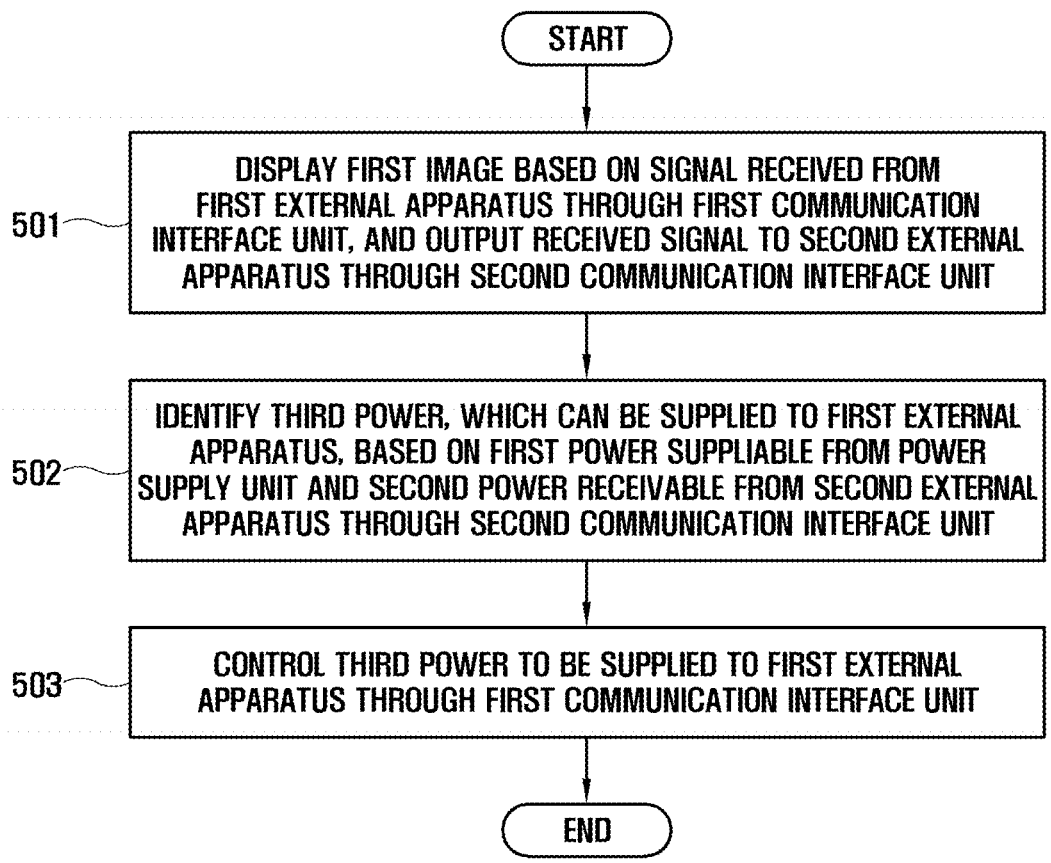
FIG. 5 is a flowchart illustrating an example process of providing boosted power according to various embodiments.

FIG. 5 is a flowchart illustrating an example process of providing boosted power according to an embodiment of the disclosure. In the various example embodiments including that illustrated in FIG. 5, it will be described that the first display apparatus 21 receives the charging power from the second external apparatus, e.g., the second display apparatus 22, and supplies the boosted charging power to the first external apparatus, e.g., the image providing apparatus 10.

Referring to FIG. 5, at operation 501, the first controller 231 (e.g., the scaler) of the first display apparatus 21 may control the display 210 to display a first image based on a signal received from the first external apparatus, e.g., the image providing apparatus 10 through the first communication interface unit 221, and control a signal received from the first external apparatus to be output to the second external apparatus, e.g., the second display apparatus 22 through the second communication interface unit 222 so that a second image can be based on that signal.

A signal to be transmitted to the second display apparatus 22, for example, a signal (e.g., video/audio) based on the DP protocol may be output to the second communication interface unit 222 through the DP out block of the first controller 231. In the disclosure, the signal based on the DP protocol may also be referred to as a first signal to be distinguished from USB data (or a second signal to be described in greater detail below).

A first controller 231a of the second display apparatus 22 may display a second image based on a signal (e.g., the first signal) received via the first display apparatus 21 from the image providing apparatus 10 through the first communication interface unit 221a. The first image and the second image may be different (on extended displays) or the same (on duplicated/cloned displays) according to settings.

At operation 502, the first controller 231 of the first display apparatus 21 may identify third power, which can be supplied to the image providing apparatus 10, based on the first power suppliable from the power supply unit 240, for example, the power generator 241, and the second power receivable from the second external apparatus, e.g., the second display apparatus 22 through the second communication interface unit 222.

The first controller 231 may perform the power negotiation based on the USB-C PD protocol to identify the power amount, e.g., the third power supplied to the image providing apparatus 10.

Figure 6:
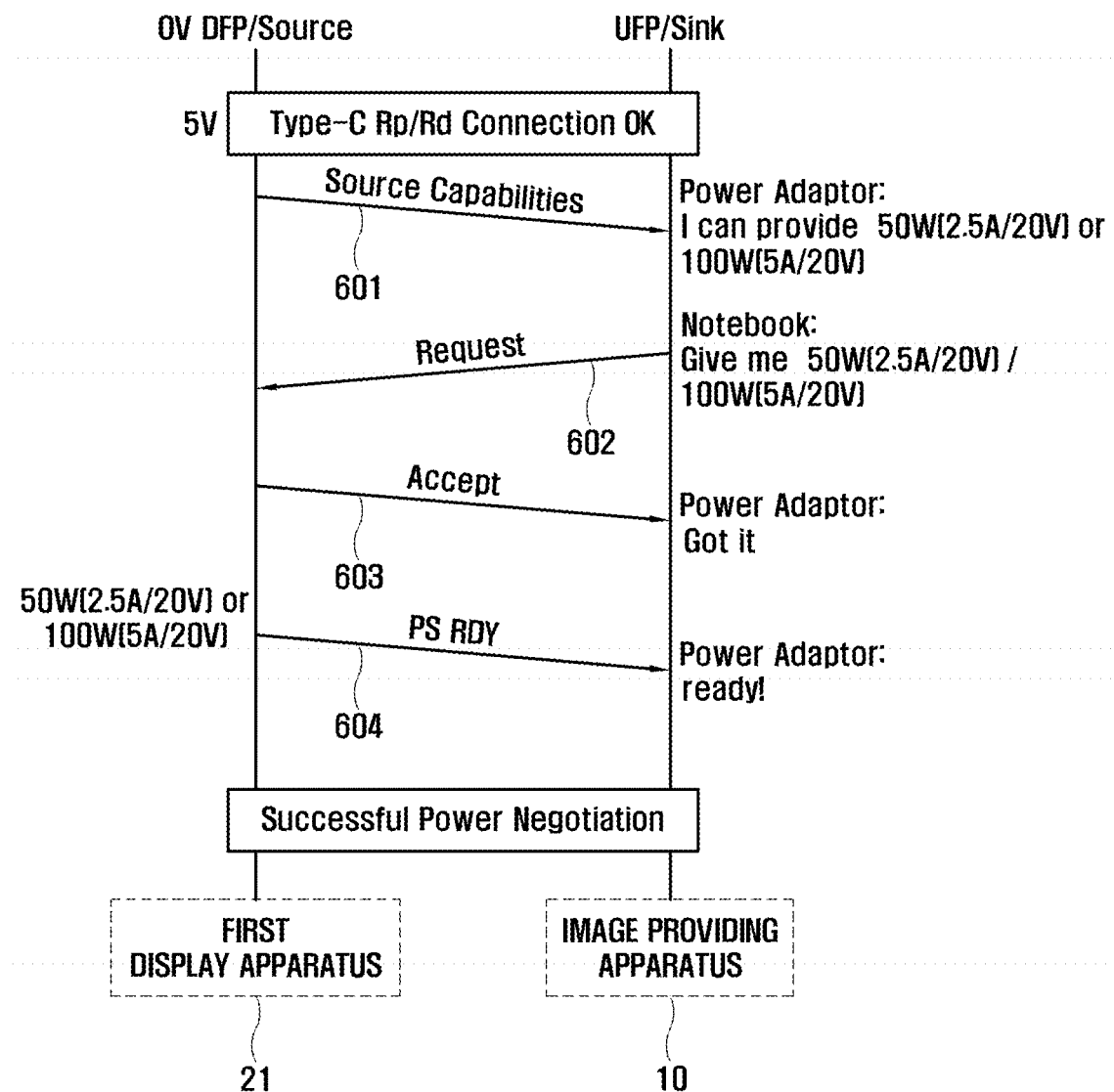
FIG. 6 is a signal flow diagram illustrating an example process of performing power negotiation according to various embodiments.

FIG. 6 is a signal flow diagram illustrating an example process of performing power negotiation according to various embodiments.

Referring to FIG. 6, based on the USB-C PD protocol, the first display apparatus 21 and the image providing apparatus 10 (e.g., the first external apparatus) are respectively set to play the roles of the power source (PWR SRC: a monitor) and the power sink (PWR SINK: a laptop computer), and perform the power negotiation at operations 601 to 604, thereby setting charging specifications.

At operation 601, the first controller 231 of the first display apparatus 21, e.g., the power source transmits information about suppliable power capabilities to the first external apparatus, e.g., the image providing apparatus 10, e.g., the power sink. The suppliable power capabilities correspond to the third power boosted higher than the first power (e.g., 50 W (2.5 A/20V)) generated by the power generator 241 itself of the first display apparatus 21.

For example, the third power may correspond to, but not limited to, power (e.g., 100 W (5 A/20V)) based on the sum of the first power and the second power (e.g., 50 W (2.5 A/20V)) receivable from the second external apparatus, e.g., the second display apparatus 22 connected through the second communication interface unit 222. In other words, the third power (e.g., 95 W) regulated from the sum power by the power regulator 242 of the power supply unit 240 may be the suppliable power capabilities. Further, the first power and the second power in this example may be the same by way of example, but the first power and the second power may be different as necessary according to apparatus specifications. For example, the first power may be 50 W, the second power may be 40 W, and the third power may be identified as 90 W.

At operation 602, the power source, e.g., the first display apparatus 21 receives a power request (e.g., a request message) corresponding to the power capacities (e.g., the third power) from the power sink, e.g., the first external apparatus, e.g., the image providing apparatus 10.

At operation 603, the first display apparatus 21 transmits an acceptance (e.g., an acceptance message) of the received power request to the image providing apparatus 10.

In addition, at operation 604, the first display apparatus 21 transmits information (PS_Ready) that the corresponding power (e.g., the third power) is ready to the image providing apparatus 10.

It has been described by way of example that the power negotiation is performed to provide the boosted power in the state that the first display apparatus 21 is connected to the second display apparatus 22. The power negotiations may be performed in the same or similar manner even when another apparatus such as the second display apparatus 22 is not connected to the second communication interface unit 222 of the first display apparatus 21.

For example, the information about the power capacities corresponding to the first power suppliable by the power supply unit 240 of the first display apparatus 21 itself is transmitted to the image providing apparatus 10 at operation 601, and the operations 602 to 604 are performed in sequence corresponding to the first power, so that the first power can be supplied as the charging power to the image providing apparatus 10.

Referring to FIG. 4, the second controller 232 (e.g., a USB hub) of the first display apparatus 21 may transmit and receive a second signal (USB data) to and from the second display apparatus 22 through the second communication interface unit 222. The second signal may refer to a signal (data) based on the USB protocol, which is distinguished from the first signal, e.g., DP video/audio output to the second display apparatus 22 by the first controller 231 of the first display apparatus 21.

According to an embodiment, the second controller 232 may be connected to the second display apparatus 22 and use a second signal (e.g., USB data). For example, as shown in FIG. 4, when a keyboard 41, a mouse 42 or the like peripheral device is connected to the USB C communication interface unit (e.g., the second communication interface unit 222) of the second display apparatus 22, the second controller 232 of the first display apparatus 21 may receive (down-stream) a USB signal from the second display apparatus 22 through the second communication interface unit 222 and output (up-stream) the USB signal to the image providing apparatus 10 through the first communication interface unit 221.

The first display apparatus 21, which is connected to the first external apparatus, e.g., the image providing apparatus 10 and provides the charging power based on the first power, may connect with the second display apparatus 22 through the second communication interface unit 222. In this case, the first controller 231 performs the power negotiation again to supply the third power as the charging power to the image providing apparatus 10. In this regard, related operations will be described in greater detail below with reference to FIG. 8.

Referring back to FIG. 5, at operation 503, the first controller 231 of the first display apparatus 21 may control the power supply unit 240 so that the third power (e.g., the boosted power) identified can be supplied to the first external apparatus, e.g., the image providing apparatus 10 through the first communication interface unit 221.

Therefore, the first display apparatus 21 can provide high charging power, which is requested by the image providing apparatus 10, by summing the power supplied from the second display apparatus 22 connected to the rear end, without increasing its own power capacities.

According to an embodiment, the first display apparatus 21 may notify a user that the high charging power is provided as connecting with the second display apparatus 22.

Figure 7:
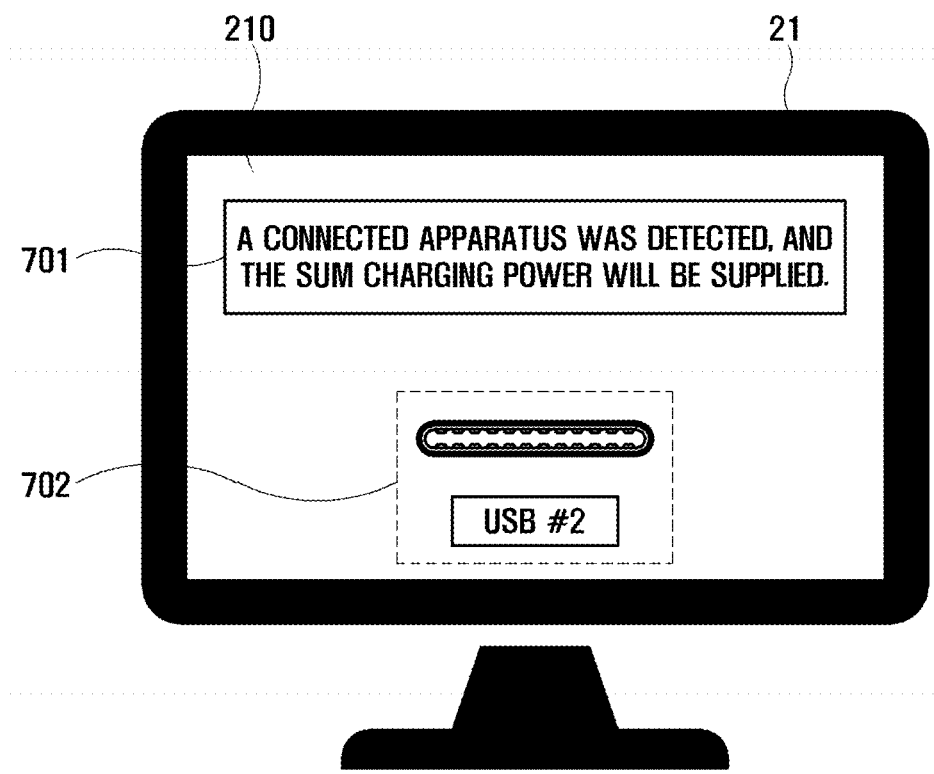
FIG. 7 is a diagram illustrating an example user interface (UI) displayed to show charging power in a display apparatus according to various embodiments.

FIG. 7 is a diagram illustrating an example UI displayed to show charging power in a display apparatus according to various embodiments.

Referring to FIG. 7, the third controller 233 of the first display apparatus 21 may control the display 210 to display a UI including a message 701 notifying that a connected apparatus, e.g., the second display apparatus 22 connected to the second communication interface unit 222 (USB #2) is detected and the charging power boosted higher than the charging power (e.g., the first power) provided by itself, e.g., the charging power (e.g., the third power) to which the second power is added is provided. Here, the UI may further show an icon 702 displayed to provide information about the interface (e.g., the second communication interface unit 222) to which the second display apparatus 22 is connected, so that a user can easily recognize that the charging power is added by additional connection of an apparatus.

Figure 8:
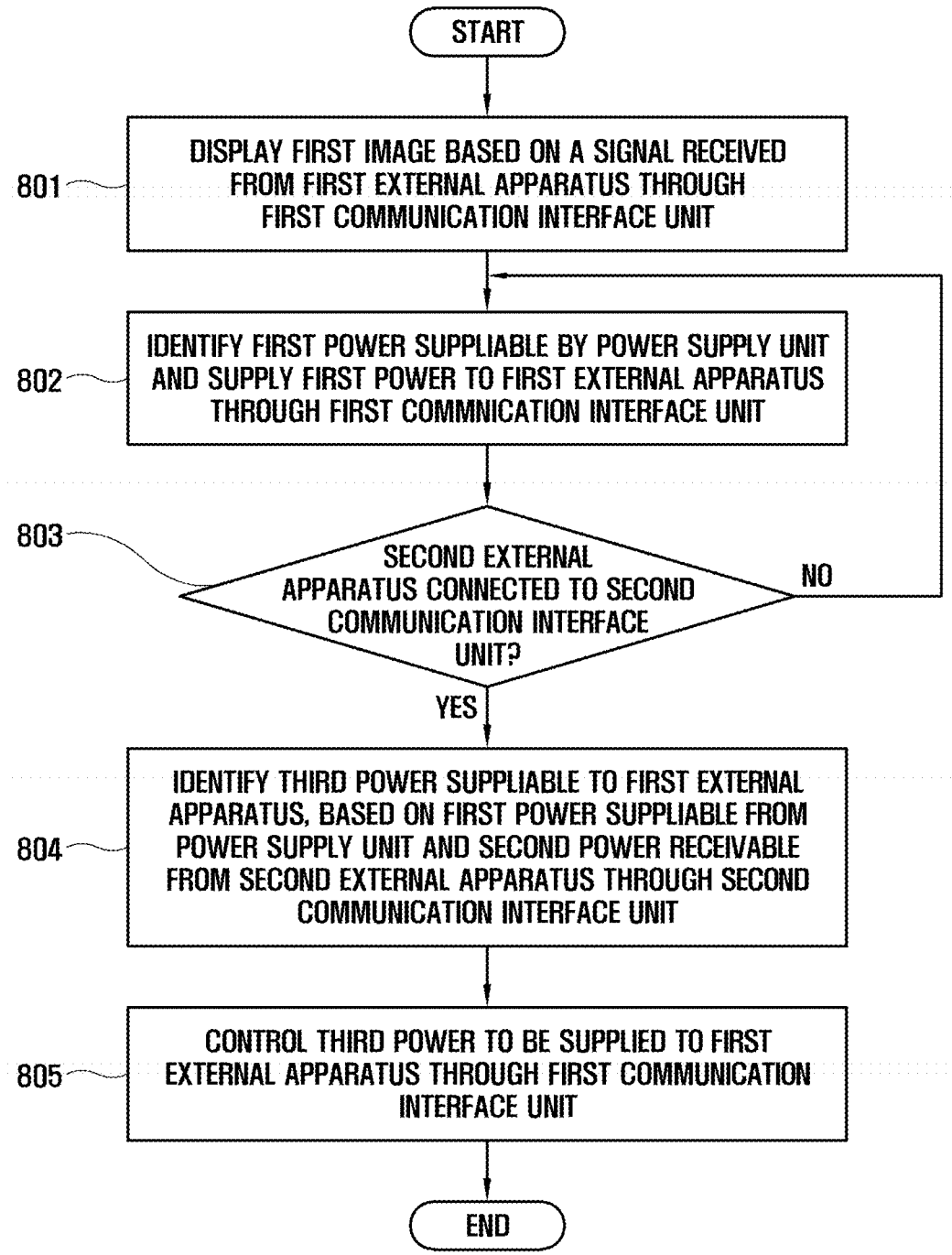
FIG. 8 is a flowchart illustrating an example process of providing boosted power by detecting connection with an external apparatus according to various embodiments.

FIG. 8 is a flowchart illustrating an example process of providing boosted power by detecting connection with an external device according to various embodiments.

The first display apparatus 21 may connect with the first external apparatus, e.g., the image providing apparatus 10 through the first communication interface unit 221.

Referring to FIG. 8, at operation 801, the first controller 231 of the first display apparatus 21 may control the display 210 to display the first image based on a signal (e.g., the first signal) received from the first external apparatus, e.g., the image providing apparatus 10 through the first communication interface unit 221. Here, referring to FIG. 4, a cable (e.g., a USB C cable) is not connected to the DP out block of the first controller 231 (e.g., the scaler), and therefore the DP out block of the first controller 231 and the elements related to the USB C PD (e.g., the PD controller 330, etc.) are all powered off.

At operation 802, the first controller 231 may identify the first power suppliable by the power supply unit 240, e.g., the power generator 241, and control the power supply unit 240 to supply the identified first power to the first external apparatus, e.g., the image providing apparatus 10 through the first communication interface unit 221.

The first power may be identified through the power negotiation described above with reference to FIG. 6. Below, for convenience, the first power negotiation performed for identifying the third power may be distinguished from the second power negotiation performed for identifying the first power. In other words, at operation 601, the information about the power capabilities corresponding to the first power suppliable by the power supply unit 240 of the first display apparatus 21 itself may be transmitted to the image providing apparatus 10, and the operations 602 to 604 are performed in sequence corresponding to the first power, thereby supplying the first power identified based on the second power negotiation as the charging power to the image providing apparatus 10.

At operation 803, the first controller 231 may detect whether a new external apparatus, e.g., the second external apparatus, e.g., the second display apparatus 22 is connected through the second communication interface unit 222 while the first display apparatus 21 is connected to the first external apparatus, e.g., the image providing apparatus 10 and providing the charging power based on the first power.

According to an embodiment, the first controller 231 may detect the connection with the second display apparatus 22 by identifying that a hot plug detection (HPD) signal is applied through the second communication interface unit 222.

Referring to FIG. 4, it is notified that cable connection from the connector 310 of the second communication interface unit 222 to the first controller 231 is detected (cable detection), thereby supplying power so that the DP out block and the PD controller 330 can operate normally.

Based on detecting the connection with the second external apparatus, e.g., the second display apparatus 22 in the operation 803, at operation 804 the first controller 231 may identify the third power suppliable to the first external apparatus, e.g., the image providing apparatus 10, based on the first power suppliable from the power supply unit 240, e.g., the power generator 241 and the second power receivable from the second external apparatus, e.g., the second display apparatus 22 through the second communication interface unit 222.

The third power may be identified by performing the power negotiation (e.g., the first power negotiation) described with reference to FIG. 6. In other words, the first controller 231 may perform the operations 601 to 604 as described with reference to FIG. 5, thereby identifying the boosted third power (e.g., the sum power) as the suppliable power.

At operation 805, the first controller 231 may control the power supply unit 240 so that the identified third power (e.g., the boosted power) can be supplied to the first external apparatus, e.g., the image providing apparatus 10 through the first communication interface unit 221.

Therefore, the connection with the second display apparatus 22 is automatically detected while the first display apparatus 21 is used as being connected to the image providing apparatus 10, and the power supplied from the second display apparatus 22 connected to the rear end is added to thereby provide the high charging power requested by the image providing apparatus 10.

Figure 9:
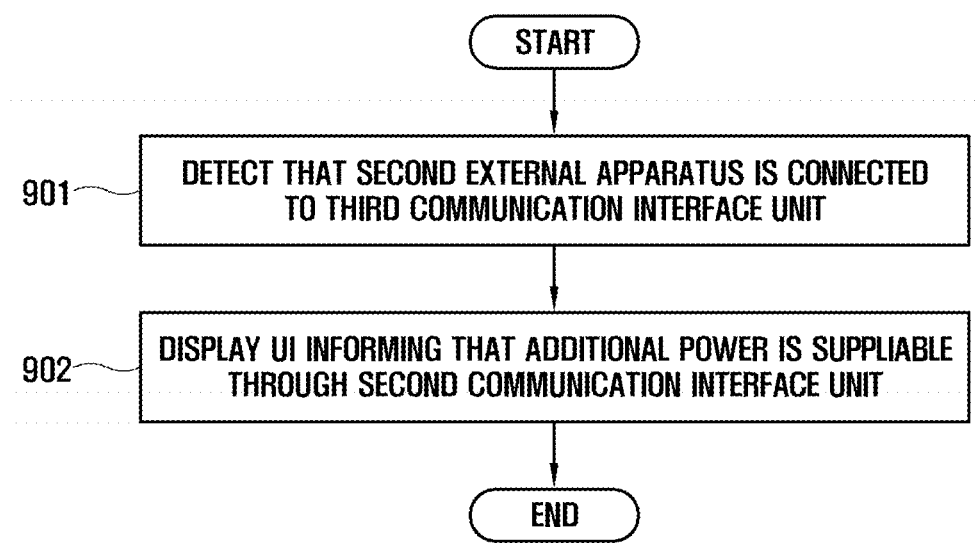
FIG. 9 is a flowchart illustrating an example process of providing boosted power by changing connection with an external apparatus according to various embodiments.

FIG. 9 is a flowchart illustrating an example process of providing boosted power by changing connection with an external device according to various embodiments.

As described above, the communication interface unit 220 of the first display apparatus 21 may further include the third communication interface unit 223 as a wired interface.

When the third communication interface unit 223 includes for example a display port (DP) connector, the second display apparatus 22 is connectable to both the second communication interface unit 222, e.g., the USB type C interface in the DP alternate mode and the third communication interface unit 223, e.g., the DP interface.

When a user connects the second display apparatus 22 to the third communication interface unit 223, the first controller 231 may output a signal (e.g., the first signal), which is received from the image providing apparatus 10 through the first communication interface unit 221, to the second display apparatus 22 through the third communication interface unit 223, and the second display apparatus 22 may display a second image based on the received signal.

However, the third communication interface unit 223 is capable of transmitting the first signal (video/audio) but does not support the power delivery (e.g., PD) for receiving power from the second display apparatus 22, thereby supplying the first power, e.g., the charging power as it is to the image providing apparatus 10.

Referring to FIG. 9, at operation 901, the first controller 231 of the first display apparatus 21 may detect that the second external apparatus, e.g., the second display apparatus 22 is connected to the third communication interface unit 223. The first controller 231 may transmit a detection result to the third controller 233.

At operation 902, the third controller 233 may control the display 210 to display a UI informing that additional power is suppliable through the second communication interface unit 222.

Figure 10:
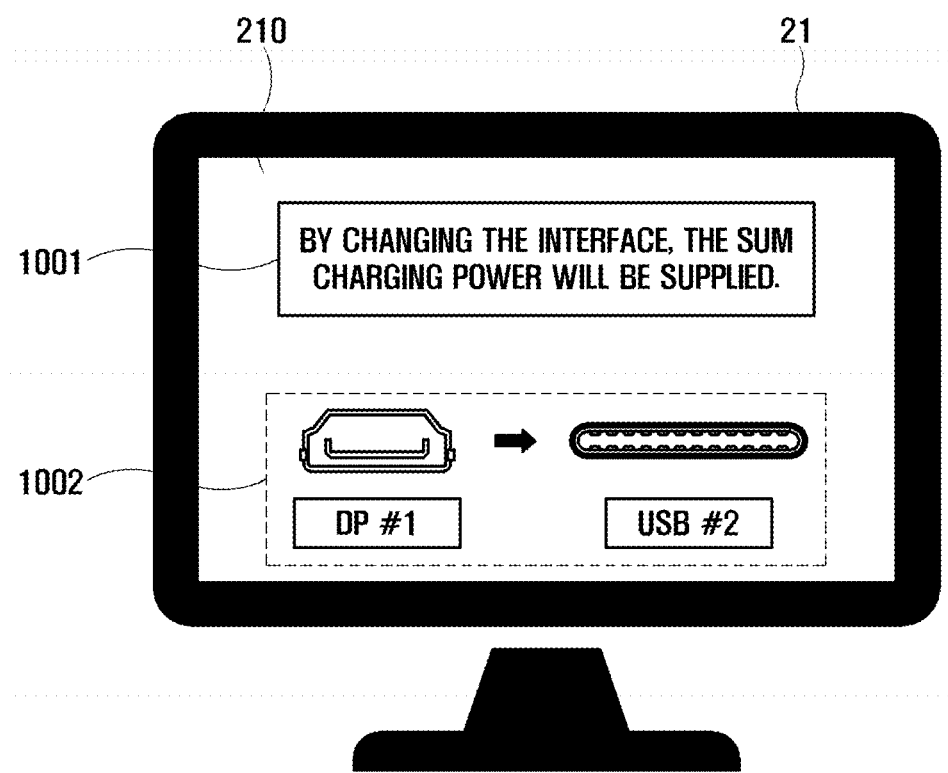
FIG. 10 is a diagram illustrating an example UI displayed to guide the supply of additional power in a display apparatus according to various embodiments.

FIG. 10 is a diagram illustrating an example UI displayed to guide the supply of additional power in a display apparatus according to various embodiments.

Referring to FIG. 10, the third controller 233 of the first display apparatus 21 may control the display 210 to display a UI with a message 1001 informing that the boosted charging power (e.g., the sum power) is providable by changing an apparatus connected to the third communication interface unit 223 (DP #1), e.g., the interface of the second display apparatus 22. The UI may further show an icon 1002 to indicate information about the third communication interface unit 223 (DP #1) to which the second display apparatus 22 is currently connected, and a substitute second communication interface unit 222 (USB #2), so that a user can easily recognize that the sum charging power can be provided by changing the connection with the apparatus.

According to an embodiment, the second communication interface unit 222 of the first display apparatus 21 is provided as a general-purpose interface/common port of which the purpose is not predetermined, and set to be used for outputting the first signal (video/audio) and receiving the charging power.

Figure 11:
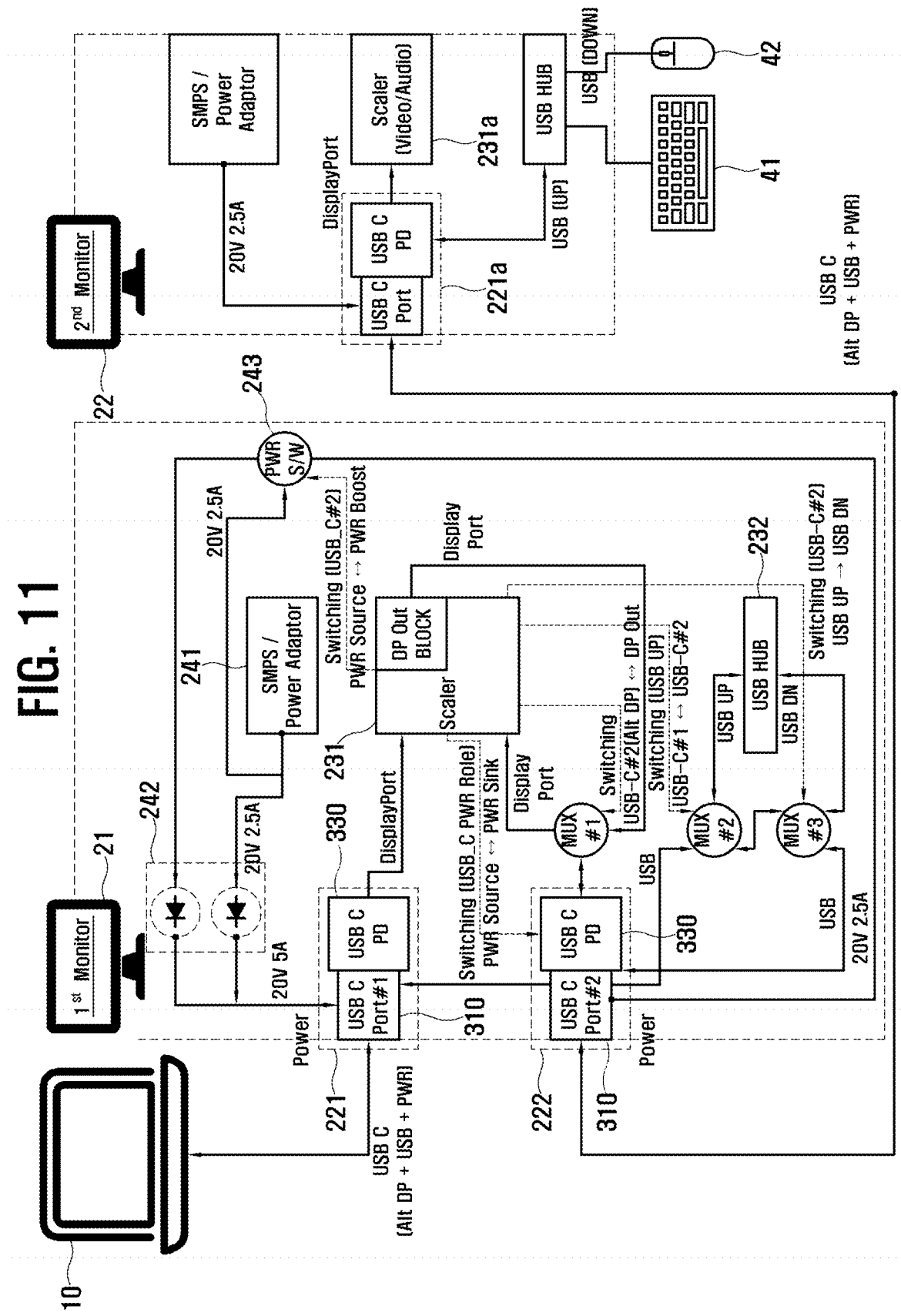
FIG. 11 is a diagram illustrating an example display system that provides boosted power based on user settings according to various embodiments.
Figure 12:
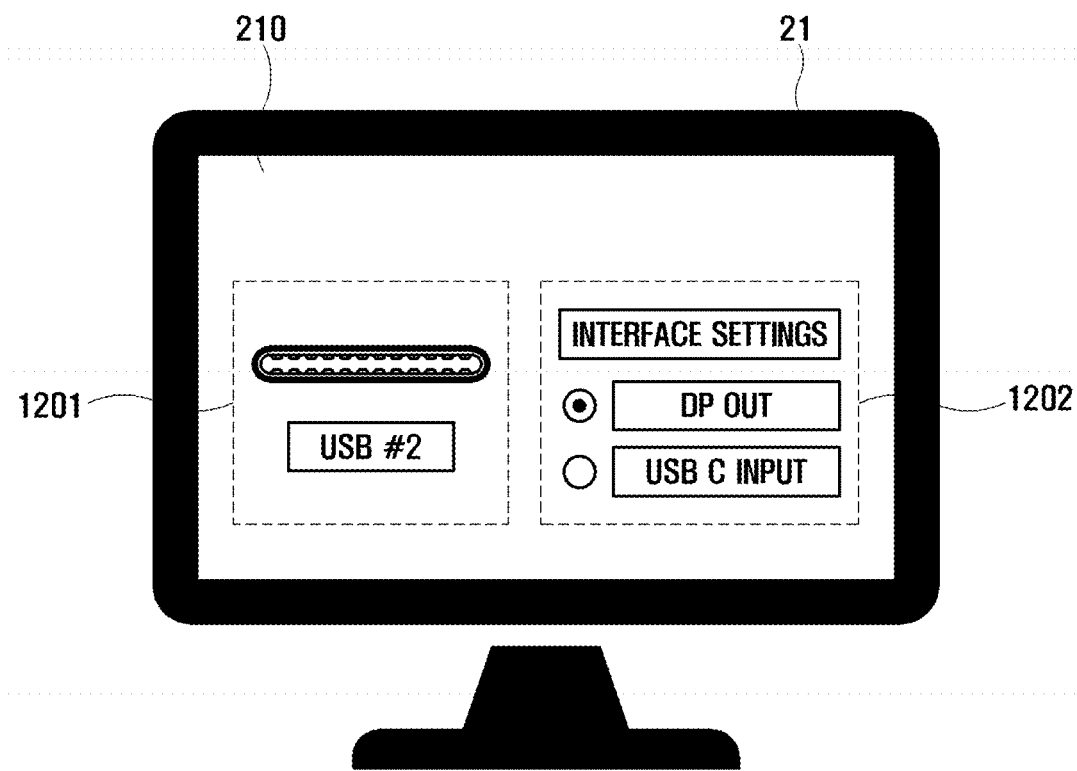
FIG. 12 is a diagram illustrating an example UI displayed to guide interface connection in a display apparatus according to various embodiments.

FIG. 11 is a diagram illustrating an example display system that provides boosted power based on user settings according to various embodiments. FIG. 12 is a diagram illustrating an example UI displayed to guide interface connection in a display apparatus according to various embodiments.

Referring to FIG. 11, the first display apparatus 21 (e.g., the first monitor) is connected to the first external apparatus, e.g., the image providing apparatus 10 (e.g., the laptop computer) through the first communication interface unit 221, and connected to the second external apparatus, e.g., the second display apparatus 22 (e.g., the second monitor) through the second communication interface unit 222. The second communication interface unit 222 may be a general-purpose interface of which the purpose is not predetermined, and is thus required to be set for communication with the second display apparatus 22.

The first display apparatus 21 may include a plurality of multiplexers (MUX circuits: MUX #1, MUX #2, MUX #3) for switching signals so that the second communication interface unit 222 can operate based on interface settings. Further, the power supply unit 240 of the first display apparatus 21 may further include a power switch 243 (PWR S/W) for switching power based on interface settings.

Referring to FIG. 12, the third controller 233 may control the display 210 to display a UI or OSD for the interface settings of the second communication interface unit 222 (USB #2).

According to an embodiment, the third controller 233 may control the display 210 to display a UI that includes an icon 1201 showing information about the interface (USB #2) targeted for the settings, and a plurality of items 1202 selectable as the settings of that interface (USB #2). Here, FIG. 12 illustrates an example that the second communication interface unit 222 can be set to either the DP out and the USB C input, but the second communication interface unit 222 may alternatively be set to purposes other than the DP out and the USB C input. Further, there may be provided a UI for setting various interfaces (e.g., the third communication interface unit 223, etc.) other than the second communication interface unit 222 to various purposes based on their support specifications.

The third controller 233 may notify the first controller 231 or the second controller 232 of a result of a user's selection for the interface settings.

When the DP out item is selected in FIG. 12, it may be set that a first signal received through the first communication interface unit 221 is transmitted to the second display apparatus 22 through the second communication interface unit 222, and power is supplied from the second display apparatus 22 through the second communication interface unit 222. As the DP out is set, the second communication interface unit 222 may be automatically set to serve as the power sink.

When the USB C input is selected in FIG. 12, the second communication interface unit 222 may be used for receiving the USB data from the connected apparatus. In this case, a user may for example use the mouse 41, the keyboard 42 and the like peripheral devices connected to the second display apparatus 22 by connecting them to the second communication interface unit 222. According to an embodiment, the second communication interface unit 222 may be preset to a USB C input mode as a default mode, and serve as the power source in this case. However, the second communication interface unit 222 may be used for various purposes, and thus set based on selection of various selectable items shown in a UI corresponding to the functions of the first display apparatus 21.

Referring to FIG. 11, when the second communication interface unit 222 is set to the DP out, the first controller 231 (e.g., the scaler) controls MUX #2 and MUX #3 so that a line for transmitting a USB signal (data) of the second communication interface unit 222 can be connected to a downstreaming (USB DN) of the second controller 232 (e.g., the USB hub) ([MUX #2]USB_UP: USB C#1, [MUX #3]USB_#2: USB DN). Further, the first controller 231 controls the power switch 243 so that the second power supplied from the second display apparatus 22 through the second communication interface unit 222 can be provided as the charging power ([PWR S/W] Discharging Power Boost Mode). In addition, when the second communication interface unit 222 is set to the DP output, the first controller 231 may communicate with the PD controller 300 of the second communication interface unit 222 to be set to serve as the power sink, and control the second communication interface unit 222 to perform the power negotiation with the second display apparatus 22.

When the settings for the second communication interface unit 222 are completed through the foregoing process, as described in FIG. 4, the first signal received through the first communication interface unit 221 is transmitted to the second display apparatus 22 through the second communication interface unit 222, and the power is supplied from the second display apparatus 22 through the second communication interface unit 222. Thus, the first controller 231 can provide the third power as the boosted charging power to the image providing apparatus 10 based on the first power suppliable by itself and the second power received from the second display apparatus 22.

Various embodiments of the disclosure and terms used therein are not intended to limit the technical features described in the disclosure, but required to be construed as including various modifications, equivalents or substitutions. In connection with the description of the drawings, like reference numerals may refer to similar or related elements. A singular form of a noun corresponding to an item may include one item or a plurality of items unless otherwise contextually indicated clearly. In this disclosure, "A or B", "at least one of A and B", "at least one of A or B", "A, B or C", "at least one of A, B and C", and "at least one of A, B, or C" and the like phrase may include any one of items listed together in the corresponding phrase, or all possible combinations thereof. "first", "second", and the like terms may be used only for distinguishing an element from other elements, and these elements are not restricted in other aspects (e.g., importance or order). When it is mentioned that one (e.g., first) element is "coupled" or "connected" to another (e.g., second) element with or without terms of "functionally" or "communicatively", one element can be connected to another element directly (e.g., by a wire), wirelessly, or through a third element.

The term "module" used in various embodiments of the disclosure may include a unit embodied in hardware, software or firmware, or any combination thereof, and is interchangeable with the terms such as, for example, logic, logic block, parts, or circuit. The module may be an integrally formed element, or a minimum unit of the element or a part of the minimum unit, which performs one or more functions.

For example, according to an embodiment, the module may be embodied in the form of an application-specific integrated circuit (ASIC).

Various embodiments of the disclosure may be carried out by software (e.g., the program) including one or more instructions stored in a storage medium (e.g., an internal memory or an external memory) readable by a machine (e.g., the electronic apparatus 10). For example, the processor (e.g., the processor 150) of the machine (e.g., the electronic apparatus 10) may call at least one instruction among one or more stored instructions from the storage medium, and execute the called instruction. This makes it possible for the machine to perform at least one function according to the at least one called instruction. The one or more instructions may include a code generated by a compiler or a code executable by an interpreter. The machine-readable storage medium may be provided in the form of a non-transitory storage medium. The, 'non-transitory' storage medium is tangible and may not include a signal (e.g., an electromagnetic wave), without distinguishing between a case where data is semi-permanently stored in the storage medium and a case where data is temporarily stored.

According to an embodiment, methods according to various embodiments of the disclosure may be provided as involved in a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product may be transitorily stored or temporarily produced in a machine-readable storage medium such as a memory of a manufacturer server, an application-store server, or a relay server.

According to various embodiments, each element (e.g., the module or the program) of the foregoing elements may include a singular entity or a plurality of entities, and some among the plurality of entities may be separated and disposed in another element. According to various embodiments, one or more elements among the foregoing elements or operations may be omitted, or one or more other elements or operations may be added. Alternatively or additionally, a plurality of elements (e.g., the module or the program) may be integrated into a single element. In this case, the integrated element may perform one or more functions of the element among the plurality of elements equally or similarly to those performed by the corresponding element among the plurality of elements before the integration. According to various embodiments, operations performed by the module, the program or other elements may be executed in sequence, in parallel, repetitively, or heuristically, or one or more among the foregoing operations may be performed in different order, be omitted or additionally include one or more other operations.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:
    a display;
    a first communication interface unit comprising interface circuitry;
    a second communication interface unit comprising interface circuitry;
    a power supply; and
    a controller, comprising at least one processor, comprising processing circuitry, individually and/or collectively, configured to:
        control the display to display a first image based on a signal received from a first external apparatus through the first communication interface unit,
        control a signal received from the first external apparatus to be output to a second external apparatus through the second communication interface unit to display a second image based on the signal,
        identify third power suppliable to the first external apparatus, based on first power suppliable by the power supply unit and second power receivable from the second external apparatus through the second communication interface unit, and
        control the power supply to supply the identified third power to the first external apparatus through the first communication interface unit.

2. The display apparatus of claim 1, wherein the third power corresponds to a sum of the first power and the second power.

3. The display apparatus of claim 1, wherein the controller is configured to: identify the third power by performing power negotiation of transmitting information about suppliable power capabilities corresponding to the third power to the first external apparatus, receiving a power request corresponding to the power capabilities from the first external apparatus, and accepting the received power request and informing the first external apparatus that power is ready.

4. The display apparatus of claim 3, wherein
    the power negotiation comprises a first power negotiation, and
    the controller is configured to:
        identify the first power by performing second power negotiation, based on detecting that the first external apparatus is connected through the first communication interface unit before the second external apparatus is connected, and
        identify the third power by performing the first power negotiation, based on detecting that the second external apparatus is connected through the second communication interface unit based on the first external apparatus being connected.

5. The display apparatus of claim 4, wherein the controller is configured to control the power supply to supply the identified first power to the first external apparatus through the first communication interface unit, based on the first external apparatus being connected through the first communication interface unit before the second external apparatus is connected.

6. The display apparatus of claim 1, further comprising:
    a third communication interface unit comprising interface circuitry that does not support power delivery, and
    a second controller comprising at least one processor, comprising processing circuitry, individually and/or collectively, configured to control the display to display a user interface (UI) informing that additional power is suppliable corresponding to the third power through the second communication interface unit, based on detecting that the second external apparatus is connected through the third communication interface unit.

7. The display apparatus of claim 1, wherein
the controller includes a first controller,
the display apparatus further comprises a second controller comprising at least one processor, comprising processing circuitry, individually and/or collectively, configured to:
control the display to display a UI for interface settings for the second communication interface unit, and
control the signal to be output to the second external apparatus through the second communication interface unit based on interface settings for the displayed UI.

8. The display apparatus of claim 1, wherein the power supply comprises a power generator configured to generate the first power, and a power regulator configured to adjust power so that the third power can be supplied to the first external apparatus based on the first power and the second power.

9. The display apparatus of claim 8, wherein the power supply further comprises a switch configured to selectively cut off the second power received through the second communication interface unit.

10. The display apparatus of claim 8, wherein the power regulator comprises a protection unit comprising protection circuitry configured to suppress overcurrent or overvoltage.

11. The display apparatus of claim 8, wherein the power regulator comprises a reverse current protection unit comprising reverse current protection circuitry configured to suppress a reverse current flowing therein through the second communication interface unit.

12. A method of controlling a display apparatus, comprising:
controlling a display to a first image based on a signal received from a first external apparatus through a first communication interface unit,
controlling a signal received from the first external apparatus to be output to a second external apparatus through a second communication interface unit to display a second image based on the signal;
identifying g third power suppliable to the first external apparatus, based on first power suppliable by a power supply unit of the display apparatus and second power receivable from the second external apparatus through the second communication interface unit; and
supplying the identified third power to the first external apparatus through the first communication interface unit.

13. The method of claim 12, wherein the third power corresponds to a sum of the first power and the second power.

14. The method of claim 12, wherein the identifying the third power comprises: performing power negotiation of transmitting information about suppliable power capabilities corresponding to the third power to the first external apparatus, receiving a power request corresponding to the power capabilities from the first external apparatus, and accepting the received power request and informing the first external apparatus that power is ready.

15. The method of claim 14, wherein
the power negotiation comprises first power negotiation, and
the method further comprises:
identifying the first power by performing second power negotiation, based on detecting that the first external apparatus is connected through the first communication interface unit before the second external apparatus is connected, and
identifying the third power by performing the first power negotiation, based on detecting that the second external apparatus is connected through the second communication interface unit while the first external apparatus is connected.

16. The method of claim 15, further comprising supplying the identified first power to the first external apparatus through the first communication interface unit, while the first external apparatus is connected through the first communication interface unit before the second external apparatus is connected.

17. The method of claim 12, further comprising displaying a user interface (UI) configured to inform that additional power is suppliable corresponding to the third power through the second communication interface unit, based on detecting that the second external apparatus is connected through the third communication interface unit that does not support power delivery.

18. The method of claim 12, further comprising:
displaying a UI for interface settings for the second communication interface unit; and
controlling a signal to be output to the second external apparatus through the second communication interface unit based on the interface settings for the displayed UI.

* * * * *